United States Patent [19]

Okamura et al.

[11] 4,200,549
[45] Apr. 29, 1980

[54] α-CYANOACRYLATE-BASE ADHESIVE COMPOSITIONS

[75] Inventors: Kenichiro Okamura, Kyoto; Yasuo Nakamuru, Hikone, both of Japan

[73] Assignee: Alpha Techno Company, Osaka, Japan

[21] Appl. No.: 908,865

[22] Filed: May 23, 1978

[30] Foreign Application Priority Data

Jul. 7, 1977 [JP] Japan ............................. 52-81745

[51] Int. Cl.$^2$ .................. C09J 3/00; C07C 121/32; C07C 121/417
[52] U.S. Cl. ........................ 252/182; 260/33.8 UA; 260/465.4; 252/188.3 R; 526/298
[58] Field of Search ............... 252/182, 188.3 R; 260/33.8 UA, 465.4; 562/147, 152; 526/298

[56] References Cited

U.S. PATENT DOCUMENTS

| 3,649,714 | 3/1972 | Wangness | 260/33.8 UA |
|---|---|---|---|
| 3,722,599 | 3/1973 | Robertson et al. | 260/465.4 |
| 3,742,018 | 6/1973 | O'Sullivan | 260/465.4 |
| 3,961,966 | 6/1976 | Brinkmann | 260/465.4 |
| 4,125,494 | 11/1979 | Schoenberg | 260/465.4 |

Primary Examiner—Richard E. Schafer
Assistant Examiner—Irwin Gluck
Attorney, Agent, or Firm—Griffin, Branigan & Butler

[57] ABSTRACT

An adhesive composition comprising 100 parts by weight of at least one α-cyanoacrylate monomer and 5 to 300 parts by weight of trichlorotrifluoroethane.

5 Claims, No Drawings

α-CYANOACRYLATE-BASE ADHESIVE COMPOSITIONS

The present invention relates to adhesive compositions, and more particularly to α-cyanoacrylate-base adhesive compositions having a high ability to penetrate into workpieces and good adhesion to oily surfaces in addition to usual adhering properties.

Adhesives of the α-cyanoacrylate type contain at least one α-cyanoacrylate monomer as the main component. α-Cyanoacrylate monomers anionically polymerize rapidly in the presence of a very small amount of water contained in the atmosphere or present in the vicinity of adherends, thus hardening within a short period of time of several seconds to several minutes. The monomers therefore have outstanding instantaneous adhering properties and are widely used in industries as instantaneous adhesives.

Despite such characteristics, the application of α-cyanoacrylate adhesives to workpieces involves a serious problem in that it is difficult to apply the adhesive to workpieces accurately in a proper amount. For use with rubber, plastics or metal materials, it is generally thought most preferable to apply 3 to 6 mg/cm$^2$ of the adhesive to ensure the highest strength. When used in a lesser amount, the adhesive will give seriously reduced bond strength, whereas an excess of the adhesive is also likely to result in lower bond strength. Additionally the use of larger quantities leads to a greatly prolonged curing time, further giving rise to other problems such as blooming, or cracking or dissolving of the adherend.

Attempts have been made to render the known α-cyanoacrylate-base adhesive applicable in a regulated quantity by using an ingenious container therefor such as one having a special slender nozzle end equipped with a capillary small nozzle, by using a syringe-like polyethylene implement with a slender nozzle or by employing a dispenser for applying the adhesive at a specified rate. However, these devices still have difficulty in assuring the desired regulation, failing to give a perfectly proper quantity.

It has also been practiced to dilute an α-cyanoacrylate monomer with a solvent such as toluene, acetone, ethyl acetate, isopropyl alcohol or nitroethane to prepare an adhesive or reduced concentration and lower surface tension which is adapted to form coatings of smaller thickness with improved wettability. The adhesive nevertheless has the drawbacks of increased curing time, very poor bond strength, susceptibility to blooming, reduced storage stability, and toxicity and odor which would cause environmental pollution.

Our research has revealed that when trichlorotrifluoroethane is added to an α-cyanoacrylate monomer, the resulting composition is applicable to workpieces with enhanced wettability, retains the adhering properties inherent in the monomer and possesses various other effects.

Stated more specifically, this invention provides adhesive compositions of the α-cyanoacrylate type comprising 100 parts by weight of at least one α-cyanoacrylate monomer and 5 to 300 parts by weight of trichlorotrifluoroethane.

Examples of useful α-cyanoacrylate monomers for forming the adhesive compositions of this invention are alkyl α-cyanoacrylate monomers such as methyl α-cyanoacrylate, ethyl α-cyanoacrylate, butyl α-cyanoacrylate, 2-ethylhexyl α-cyanoacrylate, etc. These monomers are usable singly, or at least two of them are used in admixture.

Examples of the other component, namely trichlorotrifluoroethane, include, for example, "Freon TF" (trademark of E. I. du Pont de Nemours & Co.). Although various other fluorocarbon compounds are commercially available, trichlorotrifluoroethane is the most suitable for use in this invention.

According to this invention, 5 to 300 parts by weight, preferably 10 to 250 parts by weight, of trichlorotrifluoroethane is used per 100 parts by weight of at least one α-cyanoacrylate monomer.

Instead of adding trichlorotrifluoroethane singly to the monomer, this compound is usable in the form of a mixture consisting predominantly of trichlorotrifluoroethane as admixed with another fluorocarbon compound or solvent such as acetone, methyl ethyl ketone, methanol, ethanol, ethyl acetate, butyl acetate, nitroethane, cellosolve acetate, methyl cellosolve, n-hexane, cyclohexane, toluene, methylene chloride or the like. Such a mixture is used in an amount of 5 to 300 parts by weight per 100 parts by weight of α-cyanoacrylate monomer.

The adhesive compositions of this invention may further incorporate other additives such as an impact resistance improving agent, viscosity adjusting agent or stabilizer when so desired. For example, use of a very small amount of triethanolamine, diethanolamine, monoethanolamine, aniline, dimethylaniline, diethylaniline or like amine is effective in adjusting the viscosity of the composition and avoiding blooming.

The α-cyanoacrylate adhesive compositions of this invention have the following outstanding advantages over commercial adhesives of the similar type. First, the compositions are applicable to workpieces with enhanced wettability and retain improved usual adhering properties. When dispensed from a usual container in a droplet or several droplets, the present composition forms a thin uniform coating without the necessity of using a special container, nozzle or applicator. Second, the present compositions have an exceedingly high ability to penetrate into materials. For example, they can readily spread through a clearance of 1/1,000 mm or smaller. Third, the compositions easily adhere to workpieces even in the presence of a small amount of oil on the surface without the need for pretreatment. Fourth, the compositions remain stable at room temperature (about 20° C.) for more than 6 months, giving the desired bond strength free of any change. Fifth, the compositions form coatings free of any blooming.

This invention will be described below with reference to examples, in which the parts are all by weight.

EXAMPLE 1

Adhesive compositions were prepared from the ingredients listed in Table 1 below and applied in an amount of one droplet (0.02 cc) per 3 cm$^2$ to adherends to test the compositions for setting time and bond strength. The compositions were also tested for storage stability. The results are shown in Table 1. These properties were determined by the following methods.

Setting time: Each pair of adherends was held pressed after the application of adhesive composition, and the time (seconds) required for the adherends to become immovable as relieved of the pressure was measured.

Bond strength: Determined according to JIS K-6850 (method of testing adhesives for bond strength against tensile shearing force). The adherends were allowed to stand for curing at room temperature (20±2° C.) for 24 hours after the application of adhesive composition.

Storage stability: The specimen was first checked for appearance, viscosity and setting time. The specimen (20 g) was retained, as placed in a container, within a constant-temperature chamber maintained at a temperature of 40±2° C. with air circulation for 45 days. The specimen was thereafter examined again for appearance, viscosity and setting time. The results were compared with the first results for the evaluation of the stability.

Table 1

| | Proportions (parts) | | | | |
|---|---|---|---|---|---|
| | Reference Example | Example 1 | Comparison Example | | |
| Ingredients | | | | | |
| Ethyl α-cyanoacrylate* | 150 | 100 | 100 | 100 | 100 |
| Trichlorotrifluoroethane | — | 50 | — | — | — |
| Acetone | — | — | 50 | — | — |
| Toluene | — | — | — | 50 | — |
| Ethyl acetate | — | — | — | — | 50 |
| Properties | | | | | |
| Setting time** (sec.) | 3–4 | 3–4 | 10–20 | At least 50 | At least 50 |
| Bond strength*** (kg/cm$^2$) | 118 | 150 | 70 | 60 | 41 |
| Storage stability | Good | Good | Increased viscosity | Increased viscosity | Good |

*Low-viscosity commerical product.
**Chloroprene-to-chloroprene adhesion.
***Steel-to-steel adhesion.

The results listed in Table 1 show that the adhesive composition of this invention, although diluted, is comparable to Reference Example in setting time and gives higher bond strength.

EXAMPLE 2

An adhesive composition was prepared from the ingredients given below according to this invention and tested in the same manner as in Example 1. The results as shown in Table 2 below.

| | |
|---|---|
| Ethyl α-cyanoacrylate monomer (low-viscosity commercial product) | 100 parts |
| Trichlorotrifluoroethane | 50 parts |
| Acetone | 10 parts |

Table 2

| | Setting time (sec.) | Bond strength (kg/cm$^2$) | Storage stability |
|---|---|---|---|
| Chloroprene-to-chloroprene adhesion | 5–6 | 138 | Good |
| Bakelite-to-bakelite adhesion | 5–8 | Fracture in the adherend | Good |
| Rigid PVC-to- | 30–40 | Fracture in | Good |

Table 2-continued

| | Setting time (sec.) | Bond strength (kg/cm$^2$) | Storage stability |
|---|---|---|---|
| PVC adhesion | | the adherend | |

EXAMPLE 3

Steel panels formed with a thin coating of machine oil (product #52, manufactured by Esso Standard Oil Company) were bonded together in the same manner as in Example 1 with use of the commercial adhesive or present composition listed in Table 3, and the resulting assembly was tested for bond strength in the same manner as in Example 1. Table 3 also shows the results.

Table 3

| Adhesive composition | | Bond strength (kg/cm$^2$) |
|---|---|---|
| Ethyl α-cyanoacrylate (commercial product) | | 85 |
| Ethyl α-cyanoacrylate | 100 parts | 143 |
| Trichlorotrifluoroethane | 100 parts | |

EXAMPLE 4

An adhesive composition was prepared from the ingredients given below and applied to a steel panel, with the result that the coating was found to be free of any blooming.

| | |
|---|---|
| Ethyl α-cyanoacrylate monomer | 59 parts |
| Trichlorotrifluoroethane | 40 parts |
| Ethanol (containing 0.001 part of triethanolamine) | 1 part |

What we claim is:

1. An α-cyanoacrylate-base adhesive composition comprising 100 parts by weight of at least one α-cyanoacrylate monomer and 5 to 300 parts by weight of trichlorotrifluoroethane.

2. An α-cyanoacrylate-base adhesive composition as defined in claim 1 which incorporates 10 to 250 parts by weight of trichlorotrifluoroethane per 100 parts by weight of α-cyanoacrylate monomer.

3. An α-cyanoacrylate-base adhesive composition as defined in claim 1 wherein the α-cyanoacrylate monomer is an alkyl α-cyanoacrylate monomer selected from the group consisting of methyl α-cyanoacrylate, ethyl α-cyanoacrylate, butyl α-cyanoacrylate and 2-ethylhexyl α-cyanoacrylate.

4. An α-cyanoacrylate-base adhesive composition as defind in claim 1 which incorporates the trichlorotrifluoroethane in the form of a mixture consisting predominantly of trichlorotrifluoroethane as admixed with a solvent selected from the group consisting of acetone, methyl ethyl ketone, methanol, ethanol, ethyl acetate, butyl acetate, nitroethane, cellosolve acetate, methyl cellosolve, n-hexane, cyclohexane, toluene and methylene chloride.

5. An α-cyanoacrylate-base adhesive composition as defined in claim 1 which further comprises an amine selected from the group consisting of triethanolamine, diethanolamine, monoethanolamine, aniline, dimethylaniline and diethylaniline.

* * * * *